Feb. 9, 1954
E. H. PHREANER
2,668,789
COMPOSITE RUBBER AND RESINOUS PLASTIC
MATERIALS AND METHOD OF MAKING SAME
Filed Oct. 16, 1950
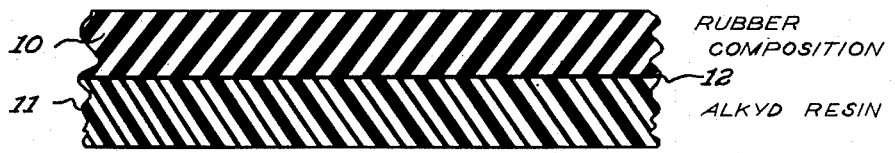
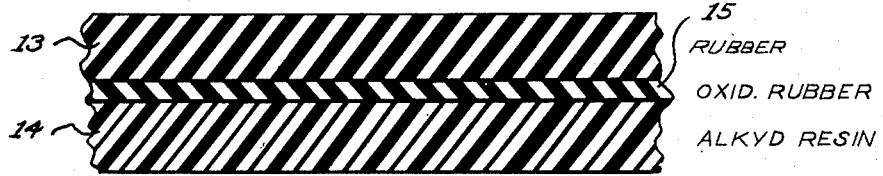
ELLIS H. PHREANER
INVENTOR.
BY Patented Feb. 9, 1954

2,668,789

UNITED STATES PATENT OFFICE 2,668,789

COMPOSITE RUBBER AND RESINOUS PLASTIC MATERIALS AND METHOD OF MAKING SAME

Ellis H. Phreaner, Los Angeles, Calif., assignor of one-third to H. Calvin White, Pasadena, Calif.

Application October 16, 1950, Serial No. 190,443

18 Claims. (Cl. 154—139)

This invention relates to new developments of composite rubber and resinous plastic materials and their methods of manufacture, and has for its general object to accomplish the integration of the rubber and resinous plastic parts of the material simultaneously and in a single molding or curing operation. It is to be understood that the invention is applicable to the making of such composite materials in any of various forms and for a wide variety of uses of which laminates, i. e. materials composed of one or more layers of the resinous plastic integrally bonded to one or more layers of the rubber, may be regarded as typical.

More particularly, the invention is directed to solution of the problem and correction of the conditions which ordinarily would be found to preclude the possibility of satisfactorily bonding together the rubber and resinous plastic in a single curing operation, by reason of the tendency of ordinary rubbers to inhibit the resin cure and thereby preclude the possibility of a strong integrating bond at the rubber-plastic interface. The invention is predicated upon the concept, among others, that curing of the resinous plastic is inhibited in the presence of anti-oxidants, and specifically the anti-oxidizing agents customarily present in rubbers. Briefly, the invention contemplates formulation of the rubber to be used to have an oxidizing potential, and to display in contact with the resinous plastic, oxidizing properties that will permit thermal setting and curing of the plastic simultaneously with vulcanization of the rubber, with resultant formation of a bond strongly integrating the two materials.

Before proceeding with a particularized description of the composite materials herein contemplated and their methods of manufacture, general reference may be had to the types of rubbers suitable for the purposes of the invention, and the general types of resinous plastic materials.

Depending upon the particular properties and qualities desired in the elastomer component, I may use any of various synthetic rubbers, particularly of the following class: polychloroprene, butadiene-acrylonitrile copolymers, butadiene-styrene copolymers, chlorinated copolymers of butadiene and acrylonitrile, acrylic acid ester polymers (e. g. Goodrich Rubber Co. "Hycar PA") and copolymers of acrylic acid ester and halogen-containing derivatives thereof (e. g. Goodrich Rubber Co. "Hycar PA 21").

As to the resins, the invention is not primarily concerned with their composition beyond the generalities of resins which normally are inhibited in their cure by any ordinary contacting rubber, so that after setting, the rubber-contacting surface of the plastic presents little bonding strength. The resins may be further characterized as those which require oxidation or the presence in their composition of an oxidizing catalyst, for proper setting or curing, and which ordinarily are inhibited in their setting by contact with a non-oxidizing or oxidation-inhibited rubber. Typical of such resins are the widely used polyester resins or alkyd resins, some of which are modified as with dialkyl phthalate or styrene, and the vinyl resins. (Commercial polyester resins are Libby-Owens-Ford Glass Co. "Plaskon" resins, Pittsburgh Plate Glass Co. "Selectron" resins, and U. S. Rubber Co. "Vibrin" resins.) Depending upon the purpose for which the molded part is to be used, these resins frequently are molded with various forms of reenforcements (sometimes laminates) such as solid inserts, fillers and fiber glass mat or woven fabric. As herein used, the term "resinous plastic" will be understood to mean a thermal setting resinous material of the character indicated.

Experience has shown that attempts to simultaneously cure and integrate these rubbers and resinous plastics have resulted unsatisfactorily by reason of the rubber-contacted surface of the plastic being inhibited in its cure and therefore prevented from acquiring a satisfactory set in bonded integration with the rubber. As previously indicated, this condition of inhibited curing of the plastic appears to result from the preventing or arresting of progressive oxidization or oxidizing catalyst action, that must continue during thermal setting of the resin, this inhibition in turn being due to the presence in the rubber of the customary anti-oxidizing agents which under the circumstances inhibit not only oxidization of the rubber beyond a certain degree, but also chemical or catalytic oxidization of the resin to the degree required for satisfactory setting.

In accordance with the invention, I condition the rubber against such adverse effects on the resinous plastic material by compounding the rubber with one or more oxidizing or oxygen-bearing compounds which impart to the rubber an oxidizing property or quality, in contrast to such rubbers as are usually compounded with anti-oxidants such as phenyl-beta-naphthylamine, polymerized trimethyl dihydroquinoline, antiquinone mono benzyl ether, hydroquinone (initially present in the rubber or added thereto), and addialpha-naphthylamine, ordinarily used to arrest or prevent oxidation of the rubber. Any of various oxidizing agents or compounds may be incorporated in the rubber to give it the desired oxidizing potential. Preferred, though typical, are any of various peroxides, as for example benzoyl peroxide (alone or compounded for example with tricresyl phosphate), 2-4 dichlorobenzoyl peroxide, p-chlorobenzoyl peroxide, t-butyl perphthalic acid, methyl-iso-butyl ketone peroxide, methyl amyl ketone peroxide and cumene hydroperoxide. Of these oxidizing agents, benzoyl peroxide may be regarded as preferred. Milder oxidizing agents may be used, but ordinarily larger quantities thereof would be required.

For certain purposes it is desirable to improve the properties of the rubber both with respect to its inherent quality and its bonded association with the resinous plastic by incorporating in the rubber silicone polymers in accordance with the disclosure in my copending application Ser. No. 776,159, filed September 25, 1947, on "Rubber-Silicone Compounds and Their Manufacture." Such modification of the rubber may result in various advantages to the composite material resulting from such effects as the elimination of migratory and volatile plasticizers in the rubber, imparting to the latter improved heat aging qualities, resistance to moisture, abrasion, greater softness and intensity of bondage to the resinous material by reason of the plasticizing qualities of the silicone polymers, and various other benefits. The details of preparing silicone polymer modified rubbers are fully dealt with in the copending application to which I have referred. For present purposes, the following description of rubbers of the class hereinabove designated, modified by the inclusion of silicone polymers, will suffice.

For purposes of the invention, the term "silicone polymer" includes polymerized organo-silicone compounds having a Si-O-Si skeleton structure with organic groups attached to the silicon atoms through Si linkages, such compounds being of open chain formation (with or without closed side or end chain) or of cyclic structure with or without methyl group substitution as by multiple carbon alkyl or aryl radicals. Being of open chain or cyclic structure, such compounds do not undergo intermolecular polymerization and hence retain their liquid form and stability despite heating.

Particularly good results have been accomplished with silicone polymers preponderately of the open chain dimethylsiloxanes with trimethylsiloxy end groups and having the general formula:

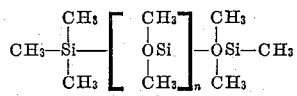

where "$n$" may be any number from one to a very large number. A range of polymer lengths from "$n$"=4, having an approximate molecular weight of 310.44, up to high polymers having approximate molecular weight of 26,400 (e. g. in the Dow-Corning "D-C" silicone fluid types "500" and "200," having viscosities from 1.5 to 1000 centistokes at 25° C.) have been used. It appears that a mixture of chain lengths is desirable, favoring cross linkage and condensation of the silicone polymer chains in the compounded rubber composition, to give a rubber-silicone composition maximum oil resistance.

It is understood that some groups in the silicone compounds contemplated for the purposes of the invention, may have hydroxyl terminations, at least during intermediate stages in the silicone polymerization. This temporary end grouping of course favors the reactivity of the compounds. Present in the higher polymers, either originally or as a result of chain condensation, may be unblocked polymer chains which aid the process of chain linking in the componded rubber.

As illustrative of the cyclic silicone polymers, I may use cyclic dimethylsiloxane polymers of the general formula $[(CH_3)_2SiO]_x$, where "$x$" may be a number ranging, for example, from 3 to 8, inclusive. These can be prepared by the depolymerization and subsequent regrouping of dimethylsiloxane high polymers under conditions of heat, alkalinity or catalysis, as by iron oxide or other metal oxides, according to the conditions existing in compounding of the rubber formulas herein disclosed, so that the presence of these cyclic forms may be contemplated. The cyclic dimethylsiloxane polymers are reactive by nature, and consequently aid in the cross linking processes.

It is further observed that other alkyl or aryl radicals may be substituted for the methyl groups for such purposes as to have a modifying effect on the physical characteristics of the polymerization product, and particularly for the purposes of the invention, to afford better dispersion qualities in compounding of the rubber formulae, and corresponding improvement of the finished product.

For certain purposes it has been found beneficial to use di-hydrocarbon substituted siloxanes having tri-hydrocarbon substituted end groups and having the following general formula, where R as a symbol for hydrocarbon substituted radicals, may represent either methyl or phenyl substitutes in approximately equal proportions:

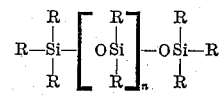

In preparing the silicone modified rubber, I may first disperse the silicone polymer on a filler, preferably one having a particular or bond affinity for the silicone. Such affinity is found to exist between the silicone polymers and silicate radicals, present for example in the alkali earth metal silicates, preferably calcium silicate, and also finely ground silica. The silicone polymer may be mixed with the silicate filler by ball milling to effect an intimate and uniform dispersion by reason of the affinity of the silicone polymer for the silica or silicate. The ratio of silicone polymer to silicate or silica may vary depending upon such considerations as the amount of filler to be desired in the rubber, and the amount of silicone polymer to be added in any given instance. This dispersion is then readily incorporated with the elastomer by intermixing in the usual rubber mills, together with other additives to be incorporated in the final product. Other methods of compounding the elastomer and silicone polymer are discussed in the copending application to which I have referred.

Considering generally again the composition of the plastic resin-contacting rubber portions or surfaces of the mold part, the desired oxidizing potential may be given the rubber by incorporating in it between about 0.5 to 10 parts of benzoyl peroxide, or an amount of other oxidizing agents of equivalent available oxygen content. It may be desirable to utilize sufficient amounts of the oxidizing agent to take advantage also of its qualities as a plasticizer and a cure activator, particularly with respect to polychloroprene. Pigment such as zinc oxide, calcium silicate, clays and magnesium oxide (particularly in polychloroprene rubbers) may be added in the range of about 25 to 75 parts per 100 parts of the rubber, to give tear resistance and desirable curing properties. For the purpose of effecting the cure of the named synthetic rubbers, with the exception of polychloroprene, I may use about 1.5 to 2.5 parts of any of the well-known and generally used sulfur-containing curing agents. In the case of polychloroprene, zinc oxide in suitable amounts, e. g. 2.5 to 5.0 parts per 100 parts of polychloroprene, may be used as a curing or vulcanizing agent and acid acceptor. Typical sulfur-containing curing agents are benzothiazyl disulfide and tetramethyl thiuram disulfide. And as previously indicated, the silicone polymer may be present in an amount between about 0.5 to 30 parts.

To provide adhesion or chemical interbonding between the rubber surface and the plastic I have found it advantageous to incorporate with the rubber compound, in addition to the oxidizing materials, certain compounds which enhance the rubber-plastic bond affinity, among which compounds are terpene-phenolic, formaldehyde-phenolic, polystyrene resins (high styrene content copolymers such as copolymers of 75% styrene and 25% butadiene), these compounds being added to the rubber composition in amounts of from 10 to 100 parts by weight to 100 parts of the synthetic rubber elastomers. Other resins compatible with these synthetic rubber polymers or copolymers to increase the bond affinity may be used, their selection also depending on the nature of the alkyd plastics, particularly as to their modification with dialkyl phthlate or styrene. Siliceous materials and the silicone polymer (particularly the aryl substituted siloxanes) enhance the bond affinity, most notably where glass fiber plastic reenforcing is used, as they enable the rubber composition to readily wet out the glass fiber. The following is a typical formulation of the rubber composition:

Example 1

| | Parts |
|---|---|
| Polychloroprene | 60 |
| Terpene-phenolic resin | 40 |
| Methyl-phenyl silicone oil | 20 |
| Silicon oxide | 20 |
| Zinc oxide | 5 |
| Magnesium oxide | 4 |
| Benzoyl peroxide | 10 |

A great advantage in bonding accrues from the simultaneous curing process of the rubber and the plastic composition, as it is recognized that one of the requirements of a good adhesion is the presence of reactive groups under conditions which prevent these reactive groups from reacting with themselves as they would have reacted if the laminates or if one of the laminates had been previously cured.

It should be recognized that in practical applications of interlaminate building, only the immediate contacting surface of the rubber composition need be formulated as herein disclosed, in order to (a) eliminate inhibition of the plastic cure, and (b) to provide good adhesion between the colaminates. Therefore the rubber laminate may be thinly surfaced with the composition I have described, this surface being established by any of the known techniques, as by ply calendering, skim coating or frictioning, or application may be made by dipping, brushing or spraying using a solvent dispersion of the rubber composition as described.

Not only can my composition be surfaced on other suitable rubber laminates but also surface coatings can be established on plastic bodies by impregnating woven fiber glass or other woven fabric with a spread coat or solvent dispersion of my composition, thus forming an impregnated fabric which can then be laminate cured with the plastic body.

The rubbers herein described will undergo their cures at the temperatures ordinarily employed (e. g. 200° to 350° F.) for curing of the plastic resins. The molding or curing pressures may vary depending upon the conditions of each job, and whether the materials are cured in a pressure-confining mold.

The following may be cited as further rubber composition formulations, the first two lacking the silicone polymer and the second two examples containing the silicone polymer.

Example 2

| | Parts |
|---|---|
| Polychloroprene | 100 |
| Silica | 25 |
| Zinc oxide | 5 |
| Magnesium oxide | 4 |
| Stearic acid | .50 |
| Benzoyl peroxide | 10 |

Example 3

| | Parts |
|---|---|
| Butadiene 65% / Acrylonitrile 35% | 100 |
| Polyvinyl chloride | 50 |
| Phenol formaldehyde resin | 40 |
| Silica | 50 |
| Zinc oxide | 5 |
| Stearic acid | .50 |
| Benzoyl peroxide | 10 |
| Tetramethyl thiuram disulfide | 2.50 |

Example 4

| | Parts |
|---|---|
| Polychloroprene | 100 |
| Methyl-phenyl silicone oil | 25 |
| Silica | 25 |
| Zinc oxide | 5 |
| Magnesium oxide | 4 |
| Stearic acid | .50 |
| Benzoyl peroxide | 10 |

Example 5

| | Parts |
|---|---|
| Butadiene 65% / Acrylonitrile 35% | 100 |
| Methyl-phenyl silicone oil | 25 |
| Silica | 50 |
| Zinc oxide | 5 |
| Stearic acid | .50 |
| Benzoyl peroxide | 10 |
| Tetramethyl thiuram disulfide | 2.50 |

The physical form and relation of the laminates in illustrative composite rubber and resin laminates embodying the invention, are illustrated in the accompanying drawing, in which:

Fig. 1 is a cross-sectional view showing laminates composed of bonded rubber and alkyd resin layers; and Fig. 2 is a similar view showing the rubber and resin layers bonded to an interlaminate of rubber having oxidizing properties.

In the laminated composite shown in Fig. 1, the layer 10 is composed of any of the non-resinous compositions described in the foregoing, which results from vulcanization of rubber compositions containing an oxidizing agent in such quantity as to give oxidizing properties to the vulcanized rubber. The alkyd resin layer 11 is bonded directly to the rubber layer 10 at their interface 12 in the same heating and curing operation.

Fig. 2 illustrates a composite or laminate of a similar nature except that here the rubber layer 13 may be of any usual composition possessing no special oxidizing properties, but which indirectly is bonded to the alkyd resin layer 14 through the intermediary of a layer 15 of rubber having the described oxidizing properties.

I claim:

1. The composite vulcanized rubber and resinous plastic product formed by simultaneously curing a heated thermal setting polyester alkyd resinous plastic composition subject to cure inhibition in the presence of rubber anti-oxidants, and a contacting body of a non-resinous rubber material comprising a vulcanizable rubber composition of the class consisting of polychloroprene, butadiene-acrylonitrile copolymers, butadiene-styrene copolymers, chlorinated copolymers of butadiene and acrylonitrile, and rubber composition containing an oxidizing agent the effect of which is to impart oxidizing properties to the vulcanized rubber at the rubber-plastic composition interface and the vulcanized rubber and plastic composition being integrated at said interface.

2. The composite vulcanized rubber and resinous plastic product formed by simultaneously curing a heated thermal setting polyester alkyd resinous plastic composition subject to cure inhibition in the presence of rubber anti-oxidants, and a contacting body of a non-resinous rubber material comprising a vulcanizable rubber composition of the class consisting of polychloroprene, butadiene-acrylonitrile copolymers, butadiene-styrene copolymers, chlorinated copolymers of butadiene and acrylonitrile, said rubber composition containing a peroxide the effect of which is to impart oxidizing properties to the vulcanized rubber at the rubber-plastic composition interface and the vulcanized rubber and plastic composition being integrated at said interface.

3. A laminated composite vulcanized rubber and plastic sheet product formed by simultaneously curing a layer of heated thermal setting polyester alkyd resinous plastic composition subject to cure inhibition in the presence of rubber anti-oxidants, and a contacting layer of a vulcanizable non-resinous rubber composition of the class consisting of polychloroprene, butadiene-acrylonitrile copolymers, butadiene-styrene copolymers, chlorinated copolymers of butadiene and acrylonitrile, said rubber composition layer containing an oxidizing agent the effect of which is to impart oxidizing properties to the vulcanized rubber layer at its surface of contact with the resinous plastic layer and said layers being integrated at said surface.

4. A laminated composite vulcanized rubber and plastic sheet product formed by simultaneously curing plural layers of heated thermal setting polyester alkyd resinous plastic composition subject to cure inhibition in the presence of rubber anti-oxidants, and contacting alternate layers of vulcanizable non-resinous rubber composition of the class consisting of polychloroprene, butadiene-acrylonitrile copolymers, butadiene-styrene copolymers, chlorinated copolymers of butadiene and acrylonitrile, said rubber composition layer containing an oxidizing agent the effect of which is to impart oxidizing properties to the vulcanized rubber layer at its surface of contact with the resinous plastic layer and said layers being integrated at said surface.

5. The composite vulcanized rubber and resinous plastic product formed by simultaneously curing a heated thermal setting polyester alkyd resinous plastic composition containing a sheet reenforcement subject to cure inhibition in the presence of rubber anti-oxidants, and a contacting body of a non-resinous rubber material comprising a vulcanizable rubber composition of the class consisting of polychloroprene, butadiene-acrylonitrile copolymers, butadiene-styrene copolymers, chlorinated copolymers of butadiene and acrylonitrile, said rubber composition containing an oxidizing agent the effect of which is to impart oxidizing properties to the vulcanized rubber at the rubber-plastic composition interface and the vulcanized rubber and plastic composition being integrated at said interface.

6. A laminated composite vulcanized rubber and plastic sheet product formed by simultaneously curing a layer of heated thermal setting polyester alkyd resinous plastic composition containing a sheet of woven fiber glass and subject to cure inhibition in the presence of rubber anti-oxidants, and a contacting layer of a vulcanizable rubber composition of the class consisting of polychloroprene, butadiene-acrylonitrile copolymers, butadiene-styrene copolymers, chlorinated copolymers of butadiene and acrylonitrile, said rubber composition layer containing an oxidizing agent imparting oxidizing propertes to the vulcanized rubber layer at its surface of contact with the resinous plastic layer and said layers being integrated at said surface.

7. The composite vulcanized rubber and resinous plastic product formed by simultaneously curing a heated thermal setting polyester alkyd resinous plastic composition subject to cure inhibition in the presence of rubber anti-oxidants, and a contacting body of a non-resinous rubber material comprising a vulcanizable rubber composition of the class consisting of polychloroprene, butadiene-acrylonitrile copolymers, butadiene-styrene copolymers, chlorinated copolymers of butadiene and acrylonitrile, said rubber containing a uniform dispersion of a liquid polymer of a dihydrocarbon substituted siloxane in which the substituent groups are of the class consisting of alkyl and aryl groups, said rubber composition also containing an oxidizing agent the effect of which is to impart oxidizing properties to the vulcanized rubber at the rubber-plastic interface and the vulcanized rubber and plastic composition being integrated at said interface.

8. The composite vulcanized rubber and resinous plastic product formed by simultaneously curing a heated thermal setting polyester alkyd resinous plastic composition subject to cure inhibition in the presence of rubber anti-oxidants, and a contacting body of a non-resinous rubber material comprising a vulcanizable rubber composition of the class consisting of polychloroprene, butadiene-acrylonitrile copolymers, chlorinated copolymers of butadiene and acrylonitrile, said rubber composition containing a uniform dispersion of from 0.5 to 30 parts of a liquid polymer of a dihydrocarbon substituted siloxane in which the substituent groups are of the class consisting of alkyl and aryl groups, said rubber composition also containing an oxidizing agent the effect of which is to impart oxidizing properties to the vulcanized rubber at the rubber-plastic interface and the vulcanized rubber and plastic composition being integrated at said interface.

9. The composite vulcanized rubber and resinous plastic product formed by simultaneously curing a heated thermal setting polyester alkyd resinous plastic composition subject to cure inhibition in the presence of rubber anti-oxidants, and a contacting body of a non-resinous rubber material comprising a vulcanizable rubber composition of the class consisting of polychloroprene, butadiene-acrylonitrile copolymers, butadiene-styrene copolymers, chlorinated copolymers of butadiene and acrylonitrile, said rubber composition containing a uniform dispersion of a liquid polymer of a dihydrocarbon substituted siloxane in which the substituent groups are of the class consisting of alkyl and aryl groups, said rubber composition also containing a silicate radical bonded to said siloxane polymer and an oxidizing agent the effect of which is to impart oxidizing properties to the vulcanized rubber at the rubber-plastic interface and the vulcanized rubber and plastic composition being integrated at said interface.

10. A laminated composite vulcanized rubber and plastic sheet product formed by simultaneously curing a layer of heated thermal setting polyester alkyd resinous plastic composition subject to cure inhibition in the presence of rubber anti-oxidants, and a contacting layer of a vulcanizable rubber composition, said rubber layer containing a uniform dispersion of a liquid polymer of a dihydrocarbon substituted siloxane in which the substituent groups are of the class consisting of alkyl and aryl groups, said rubber composition layer also containing an oxidizing agent the effect of which is to impart oxidizing properties to the vulcanized rubber at the rubber-plastic interfaces and the vulcanized rubber and plastic layers being integrated at said interfaces.

11. The composite vulcanized rubber and resinous plastic product formed by simultaneously curing a heated thermal setting polyester alkyd resinous plastic composition containing a sheet reenforcement subject to cure inhibition in the presence of rubber anti-oxidants, and a contacting body of a non-resinous rubber material comprising a vulcanizable rubber composition of the class consisting of polychloroprene, butadiene-acrylonitrile copolymers, butadiene-styrene copolymers, chlorinated copolymers of butadiene and acrylonitrile, said rubber composition containing a uniform dispersion of a liquid polymer of a dihydrocarbon substituted siloxane in which the substituent groups are of the class consisting of alkyl and aryl groups, said rubber composition also containing an oxidizing agent the effect of which is to impart oxidizing properties to the vulcanized rubber at the rubber-plastic interface and the vulcanized rubber and plastic composition being integrated at said interface.

12. A laminated composite vulcanized rubber and plastic sheet product formed by simultaneously curing a layer of heated thermal setting polyester alkyd resinous plastic composition containing a woven fiberglass reenforcement subject to cure inhibition in the presence of rubber anti-oxidants, and contacting layer of a vulcanizable rubber composition, said rubber composition layer containing a uniform dispersion of a liquid polymer of a dihydrocarbon substituted siloxane in which the substituent groups are of the class consisting of alkyl and aryl groups, said rubber composition layer also containing an oxidizing agent the effect of which is to impart oxidizing properties to the vulcanized rubber at the rubber-plastic interfaces and the vulcanized rubber and plastic layers being integrated at said interfaces.

13. The process that includes simultaneously curing a heated thermal setting polyester alkyd resinous plastic composition subject to cure inhibition in the presence of rubber anti-oxidants, and vulcanizing a heated contacting body of a non-resinous rubber material comprising a vulcanizable rubber composition of the class consisting of polychloroprene, butadiene-acrylonitrile copolymers, butadiene-styrene copolymers, chlorinated copolymers of butadiene and acrylonitrile, said rubber composition containing an oxidizing agent the effect of which is to impart oxidizing properties to the vulcanized rubber at the rubber-plastic composition interface, and thereby integrating the vulcanized rubber and plastic composition at said interface.

14. The process that includes simultaneously curing a heated thermal setting polyester alkyd resinous plastic composition subject to cure inhibition in the presence of rubber anti-oxidants, and vulcanizing a heated contacting body of a non-resinous rubber material comprising a vulcanizable rubber composition of the class consisting of polychloroprene, butadiene-acrylonitrile copolymers, butadiene-styrene copolymers, chlorinated copolymers of butadiene and acrylonitrile, said rubber composition containing a peroxide imparting oxidizing properties to the vulcanized rubber at the rubber-plastic composition interface, and thereby integrating the vulcanized rubber and plastic composition at said interface.

15. The process of making a laminated composite rubber-plastic sheet product that includes simultaneously curing a heated thermal setting polyester alkyd resinous plastic composition in sheet form subject to cure inhibition in the presence of rubber anti-oxidants, and vulcanizing a heated contacting sheet of a rubber material comprising a vulcanizable rubber composition of the class consisting of polychloroprene, butadiene-acrylonitrile copolymers, butadiene-styrene copolymers, chlorinated copolymers of butadiene and acrylonitrile, said rubber composition containing an oxidizing agent the effect of which is to impart oxidizing properties to the vulcanized rubber at the rubber-plastic composition interface, and thereby integrating the vulcanized rubber and plastic composition at said interface.

16. The process that includes simultaneously curing a heated thermal setting polyester alkyd resinous plastic composition subject to cure inhibition in the presence of rubber anti-oxidants, and vulcanizing a heated contacting body of a non-resinous rubber material comprising a vulcanizable rubber composition of the class consisting of polychloroprene, butadiene-acrylonitrile copolymers, butadiene-styrene copolymers, chlorinated copolymers of butadiene and acrylonitrile, said rubber composition containing a uniform dispersion of a liquid polymer of a dihydrocarbon substituted siloxane in which the substituent groups are of the class consisting of alkyl and aryl groups, said rubber composition containing also an oxidizing agent the effect of which is to impart oxidizing properties to the vulcanized rubber at the rubber-plastic composition interface, and thereby integrating the vulcanized rubber and plastic composition at said interface.

17. The process that includes simultaneously curing a heated thermal setting polyester alkyd resinous plastic composition subject to cure inhibition in the presence of rubber anti-oxidants, and vulcanizing a heated contacting body of a non-resinous material comprising a vulcanizable rubber composition of the class consisting of polychloroprene, butadiene-styrene copolymers, butadiene-acrylonitrile copolymers, chlorinated copolymers of butadiene and acrylonitrile, said rubber containing a uniform dispersion of a liquid polymer of a dihydrocarbon substituted siloxane in which the substituent groups are of the class consisting of alkyl and aryl groups, said rubber composition containing also a silicate radical bonded to the siloxane polymer, and containing also an oxidizing agent the effect of which is to impart oxidizing properties to the vulcanized rubber at the rubber-plastic composition interface, and thereby integrating the vulcanized rubber and plastic composition at said interface.

18. The process of making a laminated composite vulcanized rubber and plastic sheet product that includes simultaneously curing a heated thermal setting polyester alkyd resinous plastic composition subject to cure inhibition in the presence of rubber anti-oxidants, and vulcanizing a heated contacting body of a non-resinous rubber material comprising a vulcanizable rubber composition of the class consisting of polychloroprene, butadiene-acrylonitrile copolymers, butadiene-styrene copolymers, chlorinated copolymers of butadiene and acrylonitrile, said rubber composition containing a uniform dispersion of a liquid polymer of a dihydrocarbon substituted siloxane in which the substituent groups are of the class consisting of alkyl and aryl groups, said rubber composition containing also an oxidizing agent imparting oxidizing properties to the vulcanized rubber at the rubber-plastic composition interface, and thereby integrating the vulcanized rubber and plastic composition at said interface.

ELLIS H. PHREANER.

References Cited in the file of this patent

UNITED STATES PATENTS

| Number | Name | Date |
|---|---|---|
| 1,966,856 | Groff | July 17, 1934 |
| 2,278,777 | Garvey et al. | Apr. 7, 1942 |
| 2,323,562 | Nugent | July 6, 1943 |
| 2,323,563 | Nugent | July 6, 1943 |
| 2,452,637 | Juve | July 4, 1944 |
| 2,370,913 | Procter | Mar. 6, 1945 |
| 2,386,112 | Harkins | Oct. 2, 1945 |
| 2,475,122 | Barry et al. | July 5, 1949 |
| 2,486,720 | Perkerson | Nov. 1, 1949 |